UNITED STATES PATENT OFFICE.

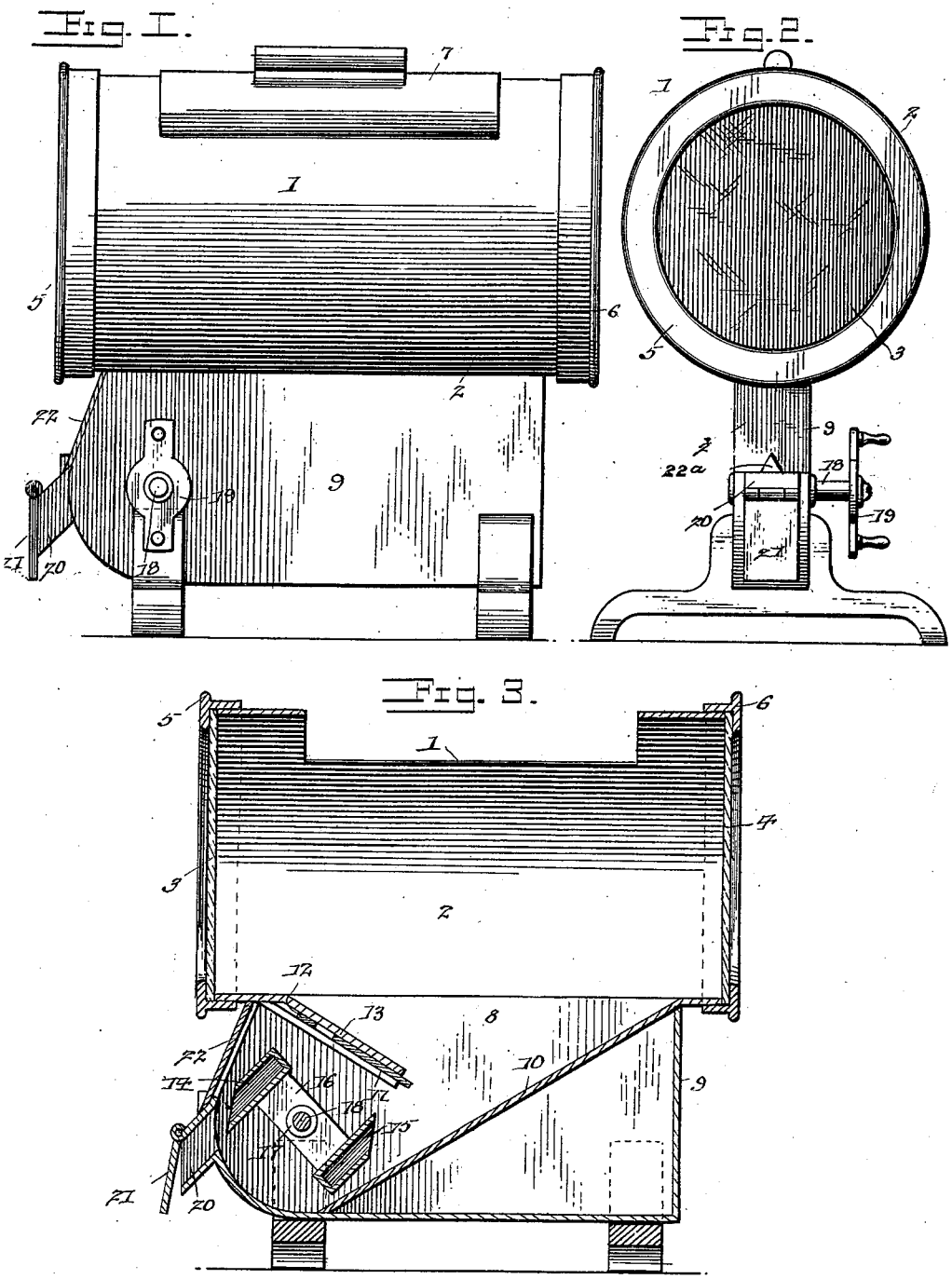

JAMES L. WEIR, OF CHATHAM, CANADA.

MECHANICAL SUGAR-BOWL.

SPECIFICATION forming part of Letters Patent No. 681,466, dated August 27, 1901.

Application filed May 13, 1898. Serial No. 680,609. (No model.)

*To all whom it may concern:*

Be it known that I, JAMES LACHLIN WEIR, gentleman, a subject of the Queen of Great Britain, and a resident of the city of Chatham, in the county of Kent, in the Province of Ontario, Canada, have invented certain new and useful Improvements in Mechanical Sugar-Bowls; and I do hereby declare that the following is a full, clear, and exact description of the same.

The invention relates to improvements in sugar-bowls.

One object of the present invention is to improve the construction of sugar-bowls and to provide a simple and comparatively inexpensive one designed for use in restaurants, confectionery stores, and analogous places where sugar is employed in mixing drinks and adapted to enable sugar to be readily and accurately discharged in the desired quantities into a glass or other receptacle.

A further object of the invention is to provide a sugar-bowl of this character adapted to exclude moisture and dust and capable of preventing flies and other insects from obtaining access to the sugar.

The invention consists in the construction and novel combination and arrangement of parts hereinafter fully described, illustrated in the accompanying drawings, and pointed out in the claims hereto appended.

In the drawings, Figure 1 is a side elevation of a mechanical sugar-bowl constructed in accordance with this invention. Fig. 2 is a front elevation of the same. Fig. 3 is a longitudinal sectional view.

Like numerals of reference designate corresponding parts in all the figures of the drawings.

1 designates a receptacle of cylindrical form, consisting of a metal drum or barrel 2, and glass ends or heads 3 and 4, arranged at the front and back of the receptacle and secured in place by flanged rims 5 and 6. The rims form circular frames for the glass ends or heads, and they may be fastened to the ends of the drum or barrel in any suitable manner. The receptacle is provided at its top with a suitable opening, and it has a cover 7, arranged over the opening, and the said cover, which is curved to conform to the configuration of the drum or barrel, is adapted to be readily removed to permit the receptacle to be filled. The receptacle is arranged over a narrow casing and is provided with a bottom opening arranged over a compartment 8, which is located within the lower casing 9 and which is formed by oppositely-inclined plates 10 and 13, extending downward from the ends of the opening of the bottom of the receptacle 2. The inclined plate or partition 10, which forms a chute, extends downward and forward from the rear end of the opening of the receptacle 2 to the front portion of the narrow casing 9, and it is adapted to direct the sugar or other contents of the receptacle from the latter to the front portion of the lower casing. The lower casing 9, which is narrow and oblong, is composed of vertical side walls, a vertical rear wall, a horizontal bottom, and a curved front. The flow of sugar to the front of the lower portion of the casing 9 is controlled by a cut-off 11, mounted in suitable ways 12 of the said inclined plate 13, which extends downward and rearward from the front end of the opening of the receptacle 2. The cut-off is provided with a finger-opening and is adapted to be readily moved upward and downward to vary the distance between its lower end and the inclined plate or partition 10. The inclined plate 13 forms a chute for directing the sugar toward the inclined plate 10, and these inclined plates form the bottom of the compartment 8 of the casing 9. The casing 9 is provided with a removable front portion or section 22, arranged at a slight inclination and supported by a bottom lug 22ª, and when the section or portion 22 is detached access may be readily had to the cut-off for adjusting the same. The inclined cut-off is located above and in rear of the curved lower portion of the front of the lower casing 9, and it divides the said casing into a front and a rear compartment or space. The front compartment or space contains a pair of scoops 14 and 15, connected by arms 16 to a hub 17, which is mounted on a transverse shaft 18, journaled in suitable bearings at the opposite sides of the lower portion of the casing 9 and extending from one side thereof and provided with a handle 19. The handle 19 is secured to the extended end of the transverse shaft and is provided at its ends with a pair of grips, by means of which the scoops may be readily rotated. The scoops are constructed of metal and are preferably of a size to contain about a teaspoonful of sugar, and they are so arranged that the point or lip is at the inner or upper side while passing through the sugar, whereby the scoop will be completely or partially filled, according to the quantity of sugar that is admitted into the front compartment by the cut-off. When the scoop arrives at the front of the lower casing 9, the point or lip is at the lower side and the sugar is permitted to slide outward into a spout 20, which directs the said sugar into the glass or other receptacle. The spout, which extends downward from the front of the lower casing 9, is provided with a hinged cover or shutter 21, connected at its upper edge to the outer end of the spout 20 at the top thereof. The hinged cover closes by gravity and is adapted to effectually exclude moisture from the casing, and it also prevents flies and other insects from entering the spout.

The mechanical sugar-bowl is operated by rotating the transverse shaft by means of the crank-handle, which causes the scoops to pass through the sugar and fill and which carries them to the spout, inverting the scoops and discharging their contents into the said spout. The scoops are tapered at their front ends and are provided with flat rear ends, and should it be desired to obtain the sugar faster than a spoonful at a time a continuous stream of sugar may be caused to pour out of the spout by a continuous reversed motion of the handle, which brings the flat back ends of the scoops against the sugar and causes a continuous discharge of the same. The pressure of the sugar against the shutter or cover 20 opens the latter and permits the sugar to escape.

One or more rotatable scoops may be employed, and I desire it to be understood that various changes in the form, proportion, and minor details of construction within the scope of the appended claims may be resorted to without departing from the spirit or sacrificing any of the advantages of this invention.

The lower narrow casing 9 is preferably mounted in suitable recesses of front and rear legs, which extend laterally from opposite sides of the casing 9.

What I claim is—

1. A mechanical sugar-bowl comprising a cylindrical receptacle provided with top and bottom openings, a curved cover resting upon the top of the cylindrical receptacle, the narrow oblong lower casing arranged beneath the cylindrical receptacle at the bottom opening thereof and provided with suitable legs and having a spout, a cut-off for regulating the flow of sugar to the spout, and a movable scoop for carrying the sugar to the spout, substantially as described.

2. A mechanical sugar-bowl comprising a receptacle, a lower casing having a spout and provided with a cut-off for controlling the flow of sugar to the spout, said lower casing being provided at its front with an opening and having a lug at the bottom thereof, a removable section covering the said opening and engaged by the said lug, and a movable scoop for carrying the sugar to the spout, substantially as described.

3. A device of the class described comprising an upper receptacle having a bottom opening, a lower casing located beneath the bottom opening and provided at its front with a removable section, a spout extending downward from the front of the lower casing, the incline 10 extending downward and forward from the rear end of the opening of the receptacle, the opposite incline 13 extending downward and rearward from the front of the said opening, a cut-off mounted on the incline 13 and located adjacent to the removable section of the lower casing, and a movable scoop located below the incline 13, substantially as described.

4. A device of the class described comprising a casing having a receptacle and provided with a lower compartment, a spout arranged at the lower compartment and having a hinged shutter, the opposite inclines arranged in the compartment, a cut-off for controlling the flow of the sugar, a shaft located below the cut-off and provided with arms, and scoops mounted on the arms and carried by the shaft, substantially as described.

5. A mechanical sugar-bowl provided with a spout and having a movable scoop adapted to carry sugar to the spout combined with the automatically-closing cover arranged vertically at the lower end of the spout and hinged at its top to the same, and adapted to be opened by the flow of the material, substantially as described.

6. A mechanical sugar-bowl comprising a cylindrical receptacle, the narrow oblong casing arranged beneath the cylindrical receptacle and provided at its front with a removable section, the oppositely-disposed front and rear inclines 13 and 10, a cut-off mounted on the front incline 13 and arranged adjacent to the said removable section, and a movable scoop, substantially as described.

JAMES L. WEIR.

Witnesses:
WALTER A. THRASHER,
PERCY G. KEMP.